(12) United States Patent
Takizawa et al.

(10) Patent No.: US 7,982,355 B2
(45) Date of Patent: Jul. 19, 2011

(54) INTERPHASE INSULATING MEMBER AND ROTATING ELECTRIC MACHINE

(75) Inventors: Keiji Takizawa, Toyota (JP); Masakazu Katoh, Anjo (JP); Jun Fujiki, Echizen (JP); Akihiro Oohashi, Fukui (JP); Masanori Imai, Fukui (JP); Yoshiki Takahashi, Fukui (JP); Yasuo Kashiwagi, Fukui (JP); Yoshihide Kitagawa, Sabae (JP)

(73) Assignees: Toyota Jidosha Kabushiki, Aichi-ken (JP); Nitto Shinko Corporation, Fukui-ken (JP)

( * ) Notice: Subject to any disclaimer, the term of this patent is extended or adjusted under 35 U.S.C. 154(b) by 143 days.

(21) Appl. No.: 12/282,773

(22) PCT Filed: Mar. 14, 2007

(86) PCT No.: PCT/JP2007/055793
§ 371 (c)(1),
(2), (4) Date: Jan. 5, 2009

(87) PCT Pub. No.: WO2007/119465
PCT Pub. Date: Oct. 25, 2007

(65) Prior Publication Data
US 2009/0189476 A1 Jul. 30, 2009

(30) Foreign Application Priority Data

Mar. 16, 2006 (JP) ................................ 2006-072402

(51) Int. Cl.
*H02K 3/34* (2006.01)
*H02K 15/10* (2006.01)

(52) U.S. Cl. ............................................. 310/215
(58) Field of Classification Search ............. 310/45, 310/215, 260, 270
See application file for complete search history.

(56) References Cited

U.S. PATENT DOCUMENTS

| | | | | |
|---|---|---|---|---|
| 4,442,371 A | * | 4/1984 | Utsunomiya et al. | ......... 310/260 |
| 4,649,640 A | * | 3/1987 | Ito et al. | ........................ 29/605 |
| 7,122,936 B2 | | 10/2006 | Takizawa et al. | |
| 2005/0168097 A1 | | 8/2005 | Takizawa et al. | |

FOREIGN PATENT DOCUMENTS

| | | | |
|---|---|---|---|
| CN | 1649238 A | | 8/2005 |
| JP | 58042216 A | * | 3/1983 |
| JP | 2004-146093 A | | 5/2004 |
| JP | 2004-289952 A | | 10/2004 |
| JP | 2005-020942 A | | 1/2005 |
| JP | 2005110417 A | * | 4/2005 |
| JP | 2005-218255 A | | 8/2005 |
| JP | 2006280157 A | * | 10/2006 |

OTHER PUBLICATIONS

Chinese Office Action corresponding to Chinese Patent Application No. 200780009335.8, dated Jun. 9, 2010.

* cited by examiner

Primary Examiner — Tran N Nguyen
(74) Attorney, Agent, or Firm — Sughrue Mion, PLLC

(57) ABSTRACT

An interphase insulating member allowing reduction in size of a rotating electric machine is provided. The interphase insulating member includes a flat portion interposed between and insulating neighboring two phases of coil ends, and a three-dimensional portion protruding from the flat portion and guiding the coil. On a surface of the flat portion, epoxy resin layer is provided as a reinforcing member.

5 Claims, 11 Drawing Sheets

INTERPHASE INSULATING MEMBER AND ROTATING ELECTRIC MACHINE

TECHNICAL FIELD

The present invention relates to an interphase insulating member and a rotating electric machine including the same and, more specifically, to an interphase insulating member insulating a plurality of coil ends from each other and a rotating electric machine including the same.

BACKGROUND ART

Conventional rotating electric machines are disclosed, for example, in Japanese Patent Laying-Open Nos. 2005-218255 (Document 1) and 2005-20942 (Document 2).

DISCLOSURE OF THE INVENTION

Prior art Document 1 discloses reinforcement of interphase insulating sheet in which the portion to be reinforced is made thick or formed of a different material. According to this method, strength against fracturing is increased, whereas strength against press-shaping is also increased. Therefore, there is a room for improvement in view of motor size reduction by press-shaping of stator core end surface.

The present invention was made to solve the above-described problem and its object is to provide an interphase insulating member that enables reduction in size of the rotating electric machine.

According to an aspect, the present invention provides a flexible interphase insulating member for insulating neighboring two phases of coil ends formed by a plurality of stator coils at an end surface of a stator core in a direction of a rotation shaft, including: a flat portion interposed between the coil ends of neighboring two phases and insulating these from each other; a three-dimensional portion having a three-dimensional shape protruded from the flat portion and guiding a coil; and a reinforcing member provided on a surface of the flat portion.

The interphase insulating member structured as such can increase strength against fracturing, while strength against press-shaping is not increased more than necessary. This enables reduction in size of the rotating electric machine.

Preferably, the interphase insulating member further includes a leg portion connecting a plurality of flat portions, and the flat portion and the leg portion are formed of the same material. Here, the leg portion and the flat portion are formed of the same material, and therefore, cost can be reduced and productivity can be improved than when a reinforcing portion is formed of a different material on a surface of the portion to be reinforced.

Preferably, the reinforcing member has higher toughness than the flat portion. Therefore, strength against fracturing is surely improved, while the strength against press-shaping is not increased more than necessary, contributing to reduction in size of the rotating electric machine.

Preferably, the reinforcing member is a film containing epoxy material. Here, use of epoxy material improves shape maintaining and shape retaining characteristics of the interphase insulating member, facilitating assembly of the rotating electric machine.

The interphase insulating member in accordance with the present invention is a flexible interphase insulating member interposed between multiphase coil windings wound around a stator core and insulating these from each other, and it includes a nonwoven fabric layer, and an epoxy resin layer provided to be in contact with the nonwoven fabric layer.

In the interphase insulating member structure as above, epoxy resin layer has high toughness and, therefore, even if the interphase insulating member is bent, the epoxy resin layer provided on the surface stretches and fracture of the interphase insulating member can be prevented. As a result, strength against fracturing can be improved. Further, as the epoxy resin layer is formed thin, increase in thickness of the interphase insulating member as a whole can be prevented. Further, the epoxy resin layer bends easily and, therefore, it is possible to reduce the size of rotating electric machine using the same.

The rotating electric machine in accordance with the present invention includes the interphase insulating member described above, and a binding member in contact with the epoxy resin layer and containing epoxy resin for securing the coil windings.

In the interphase insulating member structure as above, the binding member contains epoxy resin and, therefore, the binding member is firmly bonded to the interlayer insulating member, enabling tight winding and, hence, reduced size of the rotating electric machine.

According to the present invention, an interphase insulating member that enables size reduction of rotating electric machine and prevents fracturing can be provided.

BEST MODES FOR CARRYING OUT THE INVENTION

Figure 1:
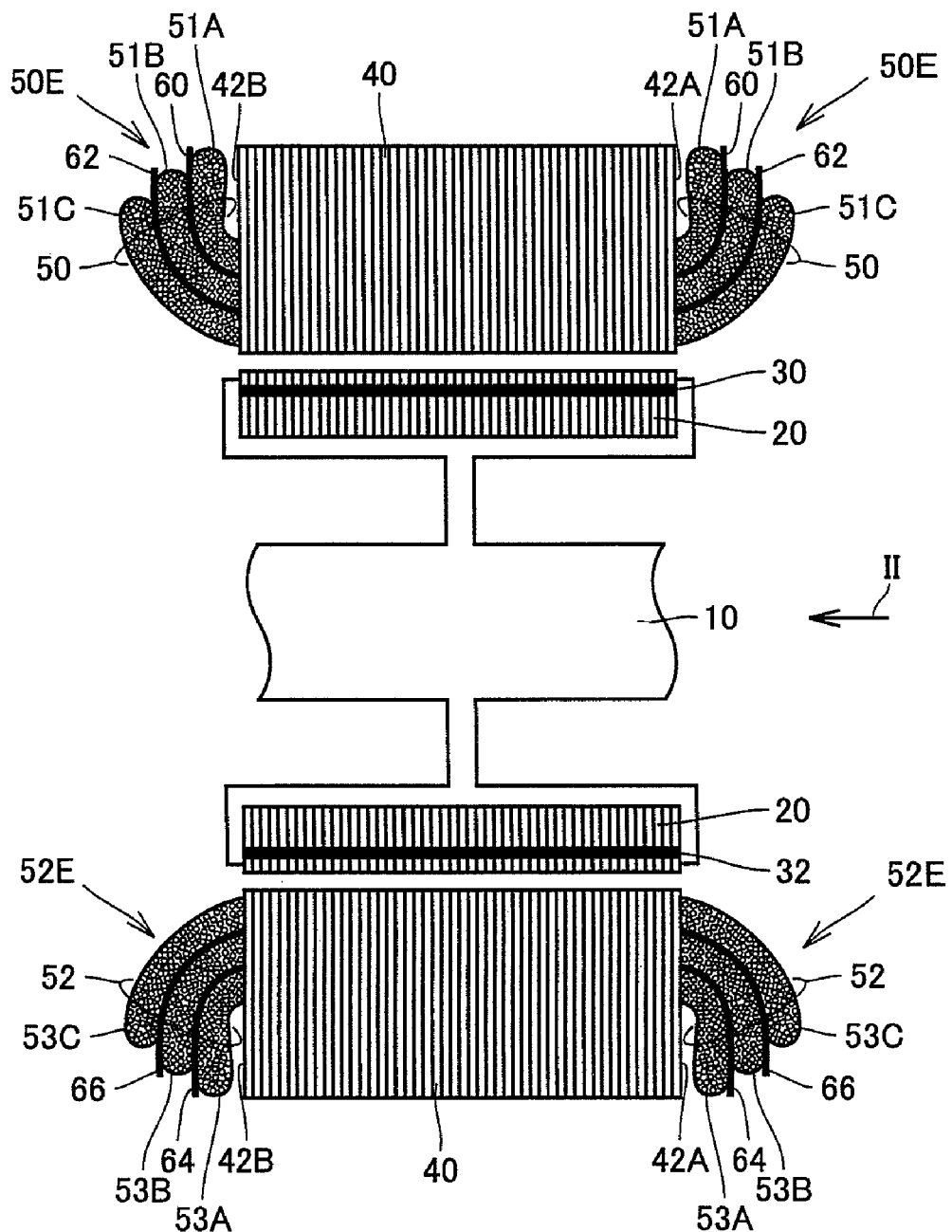
FIG. 1 is a schematic illustration showing a cross-section including a rotation shaft of a rotating electric machine 100 in accordance with Embodiment 1 of the present invention.

In the following, embodiments of the present invention will be described with reference to the figures. In the following embodiments, the same or corresponding portions are denoted by the same reference characters and description thereof will not be repeated.

Embodiment 1

FIG. 1 schematically shows a cross-section including a rotation shaft of a rotating electric machine 100 in accordance with Embodiment 1 of the present invention. Referring to FIG. 1, rotating electric machine 100 includes a rotor shaft 10, a rotor core 20, magnets 30 and 32, a stator core 40, coils 50 and 52, and interphase insulating members 60 to 66. Coil 50 includes a U-phase coil 51A, a V-phase coil 51B, and a W-phase coil 51C, and coil 52 includes a U-phase coil 53A, a V-phase coil 53B, and a W-phase coil 53C.

Rotor core 20 is formed by stacking and crimping electromagnetic steel sheets having holes for receiving magnets 30 and 32 forming rotor magnetic poles on outer circumferential portions. Rotor core 20 is fixed around rotor shaft 10 and rotates about the rotation shaft, together with the rotation shaft 10. Magnets 30 and 32 are inserted to the holes mentioned above formed at the outer circumferential portions of rotor core 20, and form rotor magnetic poles.

Stator core 40 is formed by stacking and crimping electromagnetic steel sheets in the direction of rotation shaft. Stator core 40 is provided on the outer circumference of rotor core 20 with a gap from the rotor core 20, and fixed on a housing (not shown) of rotating electric machine 100. U-phase coils 51A and 53A, V-phase coils 5B and 53B, and W-phase coils 51C and 53C are each wound around stator core 40 and form stator magnetic poles.

Interphase insulting member 60 is inserted between a coil end 50E of U-phase coil 51A and a coil end 50E of V-phase coil 51B at end surfaces 42A and 42B of stator core 40, and insulates V-phase coil 51B from U-phase coil 51A. Interphase insulating member 62 is inserted between a coil end 50E of V-phase coil 51B and a coil end 50E of W-phase coil 51C, and insulates W-phase coil 5C from V-phase coil 51B. Further, interphase insulating member 64 is inserted between a coil end 52E of U-phase coil 53A and a coil end 52E of V-phase coil 53B, and insulates V-phase coil 53B from U-phase coil 53A. Interphase insulating member 66 is inserted between a coil end 52E of V-phase coil 53B and a coil end 52E of W-phase coil 53C, and insulates W-phase coil 53C from V-phase coil 53B.

U-phase coils 51A and 53A, V-phase coils 51B and 53B and W-phase coils 51C and 53C are each wound around stator core 40, and after interphase insulating members 60 to 66 are inserted, press-shaped on end surfaces 42A and 42B of stator core 40 such that coil ends 50E and 52E extend to the outer circumference of stator core 40. Here, when each of the coil ends 50E and 52E of U-phase coils 51A and 53A, V-phase coils 51B and 53B and W-phase coils 51C and 53C is press-shaped, interphase insulating members 60 to 66 also deform. Each of the interphase insulating members 60 to 66, however, bends easily and has high toughness as will be described later and, therefore, even when coil ends 50E and 52E are press-shaped, interphase insulating members 60 to 66 are free of sheet-deviation or damage. Thus, rotating electric machine 100 can be made smaller because of press-shaping of coil ends 50E and 52E, while insulating performance between each of the coils is maintained.

Figure 2:
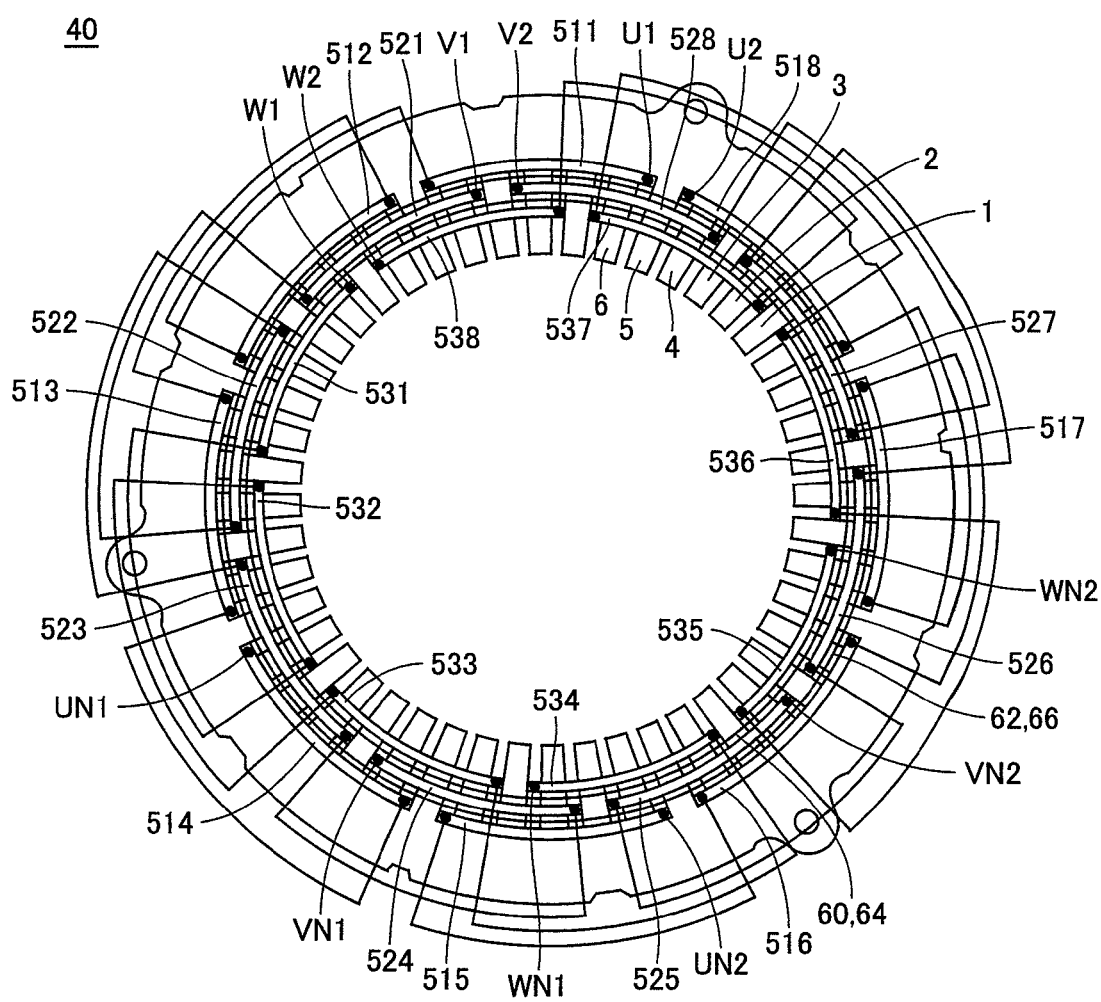
FIG. 2 is a plan view of the stator core viewed from the direction of an arrow II of FIG. 1.

FIG. 2 is a plan view of the stator core viewed from the direction of arrow II in FIG. 1. Referring to FIG. 2, coils 511 to 518 constitute U-phase coils 51A and 53A, coils 521 to 528 constitute V-phase coils 51B and 53B, and coils 531 to 538 constitute W-phase coils 51C and 53C. Coils 511 to 518 are arranged on the outermost circumference, and coils 521 to 528 are arranged inner than and shifted by a prescribed position in the circumferential direction from coils 511 to 518. Further, coils 531 to 538 are arranged inner than and shifted by a prescribed position in the circumferential direction from coils 521 to 528.

Interphase insulating members 60 and 64 are inserted between coils 511 to 518 and coils 521 to 528. In FIG. 2, for convenience of drawing, interphase insulating members 60 and 64 are shown continuous in the circumferential direction. Actually, the members are divided into a plurality of interphase insulating members, including interphase insulating members 60 and 64. Interphase insulating members 62 and 66 are inserted between coils 521 to 528 and 531 to 538. For convenience of drawing, interphase insulating members 62 and 66 are also shown continuous in the circumferential direction. Actually, however, the members are divided into a plurality of interphase insulating members, including interphase insulating members 62 and 66.

Each of the coils 511 to 518, 521 to 528 and 531 to 538 is wound around a plurality of corresponding teeth. By way of example, coil 537 corresponds to teeth 2 to 6, and wound by a prescribed number of times around teeth 2 to 6 as a whole. Other coils are also wound by a prescribed number of times around the corresponding teeth as a whole, in the similar manner as coil 537.

Coils 511 to 514 are connected in series, with one end being a terminal U1 and the other being a neutral point UN1. Coils 515 to 518 are connected in series, with one end being a terminal U2 and the other end being a neutral point UN2. Coils 521 to 524 are connected in series, with one end being a terminal V1 and the other end being a neutral point VN1. Coils 525 to 528 are connected in series with one end being a terminal V2 and the other end being a neutral point VN2. Coils 531 to 534 are connected in series with one end being a terminal W1 and the other end being a neutral point WN1. Coils 535 to 538 are connected in series and one end being a terminal W2 and the other end being a neutral point WN2.

Figure 3:
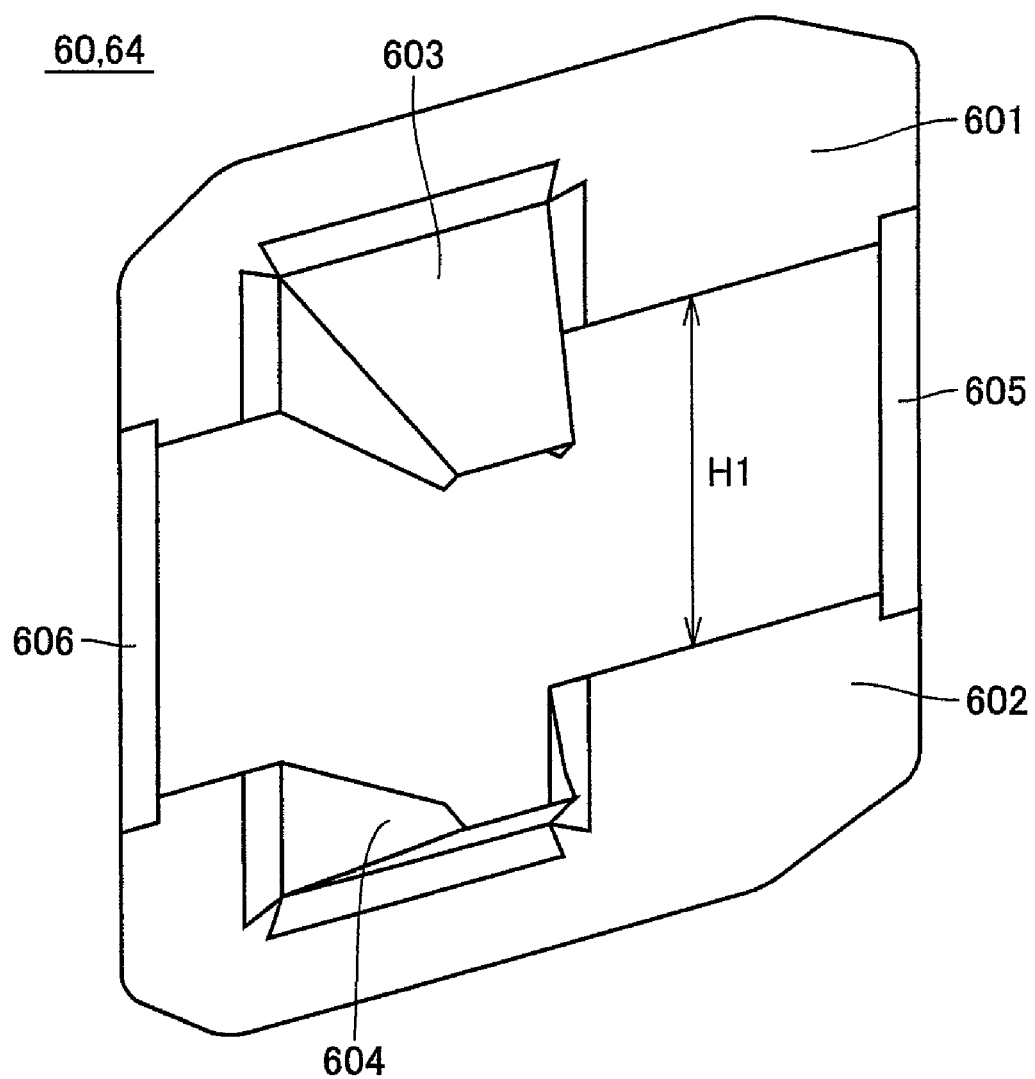
FIG. 3 is a perspective view of interphase insulating member 60, 64 inserted between a coil end of a U-phase coil and a coil end of a V-phase coil.

FIG. 3 is a perspective view of interphase insulating member 60, 64 inserted between the coil end of U-phase coil and the coil end of V-phase coil. Referring to FIG. 3, each of the interphase insulating members 60 and 64 includes flat portions 601 and 602, nose portions 603 and 604, and leg portions 605 and 606. Flat portions 601 and 602 are cut out at portions corresponding to nose portions 603 and 604.

Nose portions 603 and 604 are formed of the same member as flat portions 601 and 602, and nose portions 603 and 604 are adhered to corresponding cut-out portions of flat portions 601 and 602, respectively. For instance, nose portions 603 and 604 are firmly adhered to flat portion 601 and 602, respectively, by thermal compression bonding sheet or an adhesive tape. Nose portions 603 and 604 are attached at coil ends 50E and 52E to cover that portion of the coil which rises from stator core 40, from the inner circumferential surface of stator core 40.

Leg portions 605 and 606 are formed of the same material as flat portions 601 and 602. Opposite ends of leg portions 605 and 606 are adhered to flat portions 601 and 602 at opposite ends of flat portions 601 and 602, respectively. Leg portions 605 and 606 are inserted to slots of stator core 40. A distance H1 between flat portions 601 and 602 defined by leg portions 605 and 606 corresponds to the length in the direction of rotation shaft of stator core 40.

In each of interphase insulating members 60 and 64, leg portions 605 and 606 are inserted to the slot of stator core 40, and flat portion 601 and nose portion 603 are inserted between the coil ends of U-phase and V-phase coils on the side of end surface 42A of stator core 40. Further, flat portion 602 and nose portion 604 are inserted between the coil ends of U-phase and V-phase coils on the side of end surface 42B of stator core 40. Here, each of the interphase insulating members 60 and 64 is attached such that nose portions 603 and 604 correspond to the portions where U-phase coil rises from stator core 40 and that projecting sides of nose portions 603 and 604 face the inner circumferential side of stator core 40.

Figure 4:
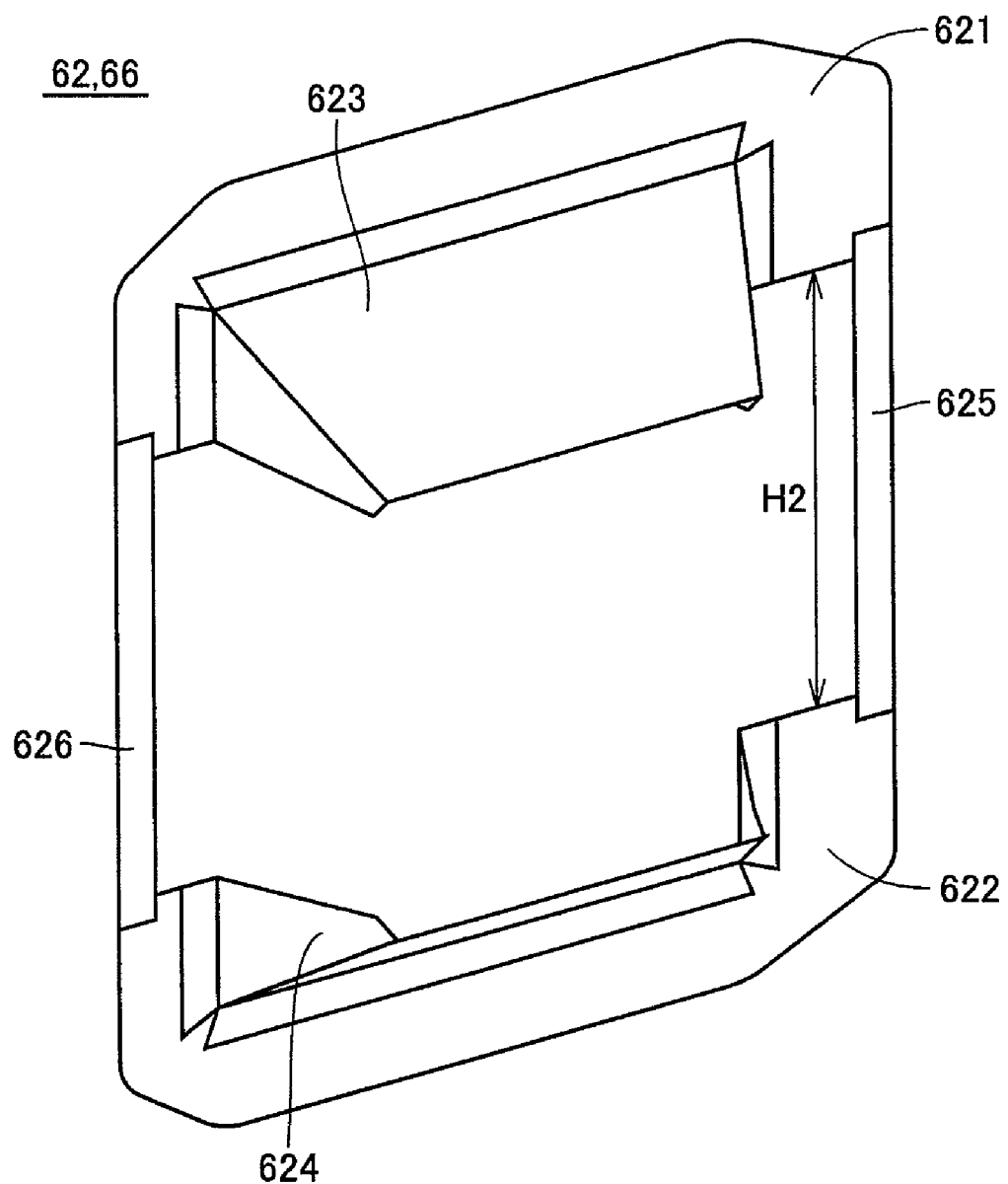
FIG. 4 is a perspective view of interphase insulating member 62, 66 inserted between a coil end of a V-phase coil and a coil end of a W-phase coil.

FIG. 4 is a perspective view of interphase insulating member 62, 66 inserted between the coil end of V-phase coil and the coil end of W-phase coil. Each of the interphase insulating members 62 and 66 includes flat portions 621 and 622, nose portions 623 and 624, and leg portions 625 and 626. The basic structure of interphase insulating member 62 and 66 is the same as that of interphase insulating members 60 and 64 shown in FIG. 3. Specifically, each of the flat portions 621 and 622, nose portions 623 and 624, and leg portions 625 and 626 is formed by adhering unwoven fabric on opposite surfaces of PET resin. Interphase insulating members 62 and 66 differ from interphase insulating members 60 and 64 shown in FIG. 3 in the width of nose portion. Specifically, the width of nose portions 623 and 624 of interphase insulating members 62 and 66 inserted between the coil end of V-phase coil and the coil end of W-phase coil is wider than the width of nose portions 603 and 604 of interphase insulating members 60 and 64 inserted between the coil end of U-phase coil and the coil end of V-phase coil. The reason for this is as follows. When the coil end is pressed, first, the U-phase coil is formed on the outermost circumference, and the V-phase and W-phase coils are formed successively to the inner circumferential side. Therefore at the portion where the coil rises from the slot, inner coil is sooner deformed in the circumferential direction.

The distance H2 between flat portions 621 and 622 defined by leg portions 625 and 626 is designed to be slightly longer than the distance H1 of interphase insulating members 60 and 64. The reason for this is that at end surfaces 42A and 42B of stator core 40, interphase insulating members 62 and 66 are arranged on the upper layer side of interphase insulating members 60 and 64 with V-phase coil interposed.

Figure 5:
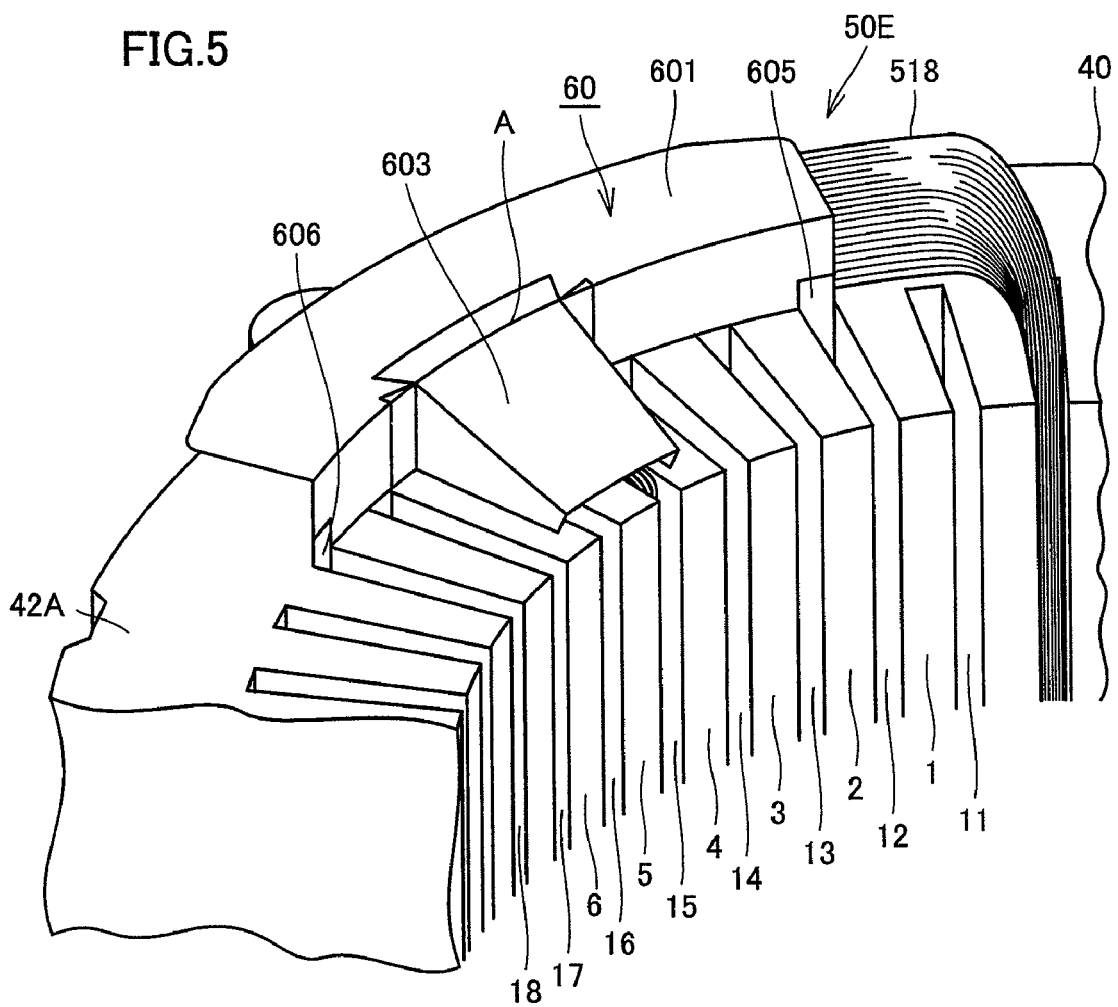
FIG. 5 is a perspective view showing an exemplary manner how the interphase insulating member 60 shown in FIG. 3 is attached to stator core 40 shown in FIG. 2.
Figure 6:
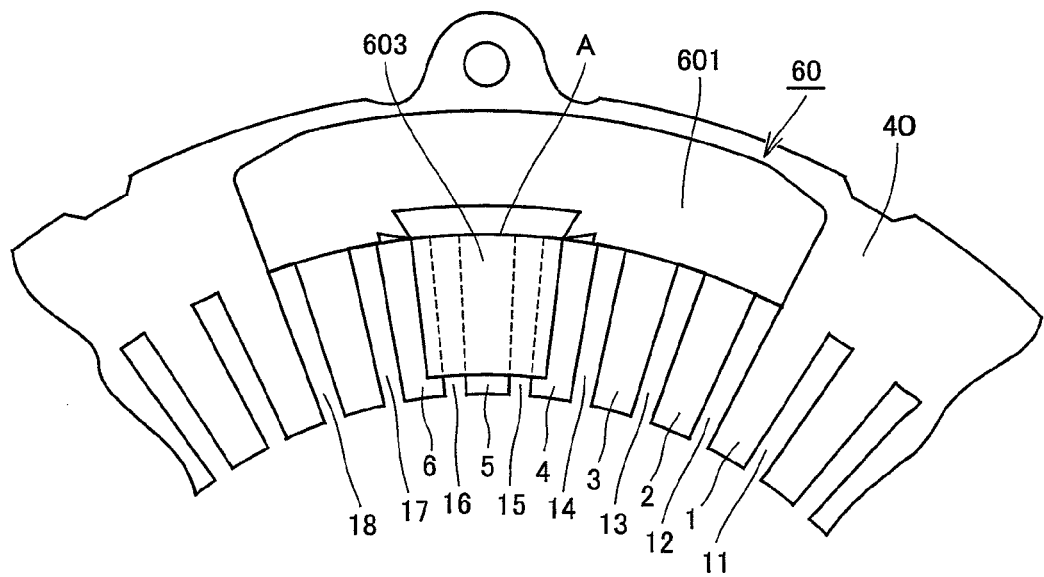
FIG. 6 is a plan view corresponding to FIG. 5, viewed from an end surface 42A of stator core 40.

FIG. 5 is a perspective view showing an example of the manner how interphase insulating member 60 shown in FIG. 3 is attached to stator core 40 shown in FIG. 2, and FIG. 6 is a plan view corresponding to FIG. 5, viewed from the side of end surface 42A of stator core 40. FIG. 6 shows, in enlargement, portions around teeth 1 to 6 of stator core 40 of FIG. 2, and the stator coil is not shown. Further, though FIGS. 5 and 6 show one interphase insulating member 60 covering a part of coil end, actually, a plurality of interphase insulating members 60 are provided closely in the circumferential direction of stator core 40.

Referring to FIGS. 5 and 6, U-phase coils 511 and 518 (U-phase coil 511 is not shown) are inserted to slots 16 and 15, respectively, rise from slots 16 and 15, and extended/press-shaped on the outermost circumference of end surface 42A of stator core 40. Leg portions 605 and 606 of interphase insulating member 60 are inserted to slots 12 and 18, respectively, such that nose portion 603 is arranged corresponding to slots 16 and 15 to which U-phase coils 511 and 518 are inserted.

Thereafter, when V-phase coils 527 and 528, not shown, provided on the inner circumferential side than interphase insulating member 60 are extended/press-shaped, interphase insulating member 60 is shaped together with V-phase coils 527 and 528, and pinched between U-phase coils 511, 518 and V-phase coils 527, 528, in such a shape as shown. Flat portion 601 is folded along the line A of nose portion 603 to form a convex crease.

Coil end 50E of U-phase coil 518 is shaped approximately flat at the portion along the circumferential direction of stator core 40, whereas it is three-dimensionally deformed significantly at the rising portion from slot 15. Taking into consideration the shape of coil rising portion after such three-dimensional deformation, nose portions 603 and 604 are provided on interphase insulating member 60. Therefore, when coil end 50E is press-shaped, sheet deviation or damage does not occur at nose portions 603 and 604.

In interphase insulating member 60, nose portions 603 and 604 and flat portions 601 and 602 are formed of separate members, and stiffness of flat portions 601 and 602 that correspond to the portions where coil end 50E are shaped flat is not much increased. The reason for this is that higher stiffness of interphase insulating layer is disadvantageous to prevent sheet deviation, and if flat portions 601 and 602 come to have excessively high stiffness, interphase insulating member much protrudes from coil end 50E, hindering reduction in size of the rotating electric machine. Therefore, significant sheet deviation does not occur at flat portions 601 and 602 at the time of press-shaping, and flat portions 601 and 602 do not hinder reduction in size of rotating electric machine 100.

Further, in interphase insulating member 60, leg portions 605 and 606 and flat portions 601 and 602 are formed of separate members, and leg portions 605 and 606 that are inserted to the slots are designed to be as thin as possible. Therefore, leg portions 605 and 606 do not decrease occupation ratio of coil in the slot and, hence, performance of rotating electric machine 100 is not degraded.

Figure 7:
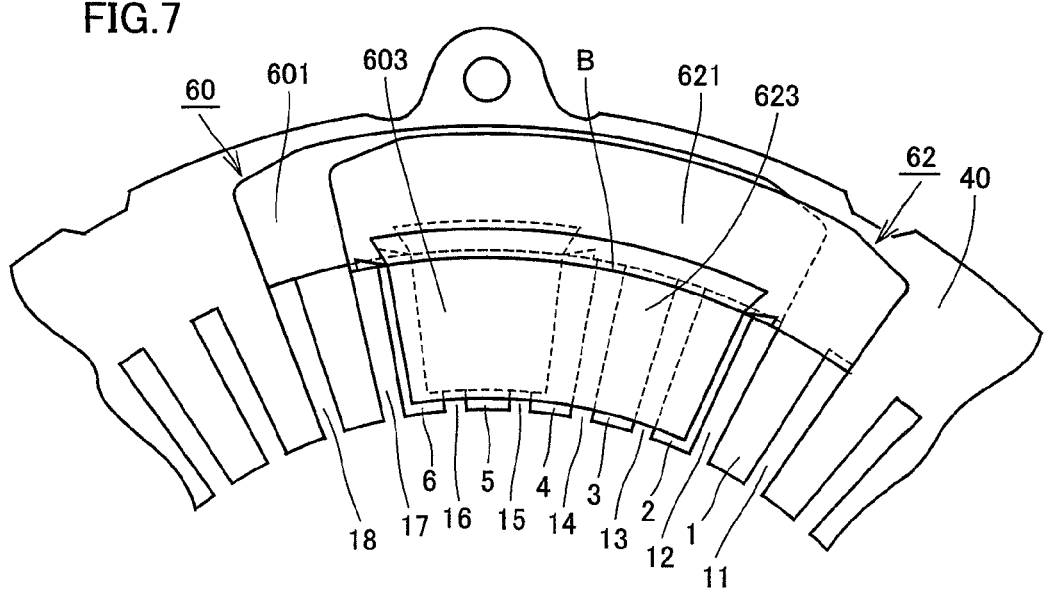
FIG. 7 shows an example of a manner how an interphase insulating member 62 shown in FIG. 4 is attached to stator core 40 shown in FIG. 2.

FIG. 7 shows an example of a manner how interphase insulating member 62 shown in FIG. 4 is attached to stator core 40 shown in FIG. 2. In FIG. 7, an example is shown in which interphase insulating member 62 is attached after attachment of interphase insulating member 60. In FIG. 7 also, one interphase insulating member 62 covering a part of coil end is shown. Actually, however, a plurality of interphase insulating members 62 are provided closely in the circumferential direction of stator core 40.

Referring to FIG. 7, V-phase coils 527 and 528, not shown, are inserted to slots 13 and 14, respectively, rise from slots 13 and 14 to the front side of the figure, and are extended/press-shaped to the inner circumferential side than U-phase coils 511 and 518, at end surface 42A of stator core 40. Interphase insulating member 62 has leg portions 625 and 626 inserted to slots 11 and 17, respectively, such that nose portion 623 is arranged corresponding to slots 13 and 14 to which V-phase coils 527 and 528 are inserted, and corresponding to nose portion 603 of interphase insulating member 60.

Thereafter, when W-phase coils 536 and 537, not shown, provided on inner circumferential side than interphase insulating member 62 are extended/press-shaped, interphase insulating member 62 is shaped together with W-phase coils 536 and 537, and pinched between V-phase coils 527 and 528 and W-phase coils 536 and 537. Flat portion 621 is folded along the line B of nose portion 623 to form a convex crease.

Coil ends of V-phase coils 527 and 528 are shaped approximately flat at the portion along the circumferential direction of stator core 40, whereas they are three-dimensionally deformed significantly at the rising portions from slots 13 and 14. Taking into consideration the shape of coil rising portion after such three-dimensional deformation, nose portions 623 and 624 are provided on interphase insulating member 62, similar to interphase insulating member 60. Therefore, when coil ends are press-shaped, sheet deviation or damage does not occur at nose portions 623 and 624.

Further, as described above, the V-phase coil after shaping is on the inner circumferential side than the U-phase coil and, therefore, it is deformed earlier at the rising portion from the slot to the circumferential direction of stator core 40, than the U-phase coil. Therefore, the V-phase coil extends over nose portion 603 of interphase insulating member 60. Further, the W-phase coil after shaping is on more inner circumferential side than the V-phase coil, and hence, it is deformed earlier at the rising portion from the slot to the circumferential direction of stator core 40, than the V-phase coil.

Here, in the interphase insulating member 62, considering the shape at the rising portion of V-phase coil and the state of arrangement of W-phase coil on the innermost circumference, nose portion 623 wide enough to cover nose portion 603 of interphase insulating member 60 as well is provided. Therefore, the coil end of W-phase coil can surely be insulated from the coil end of V-phase coil.

Figure 8:
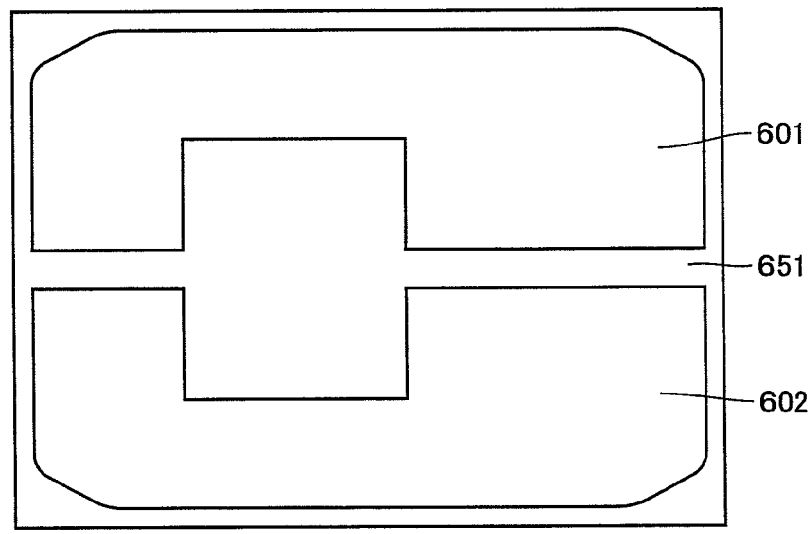
FIG. 8 illustrates the method of manufacturing interphase insulating member 60, 64 shown in FIG. 3.
Figure 9:
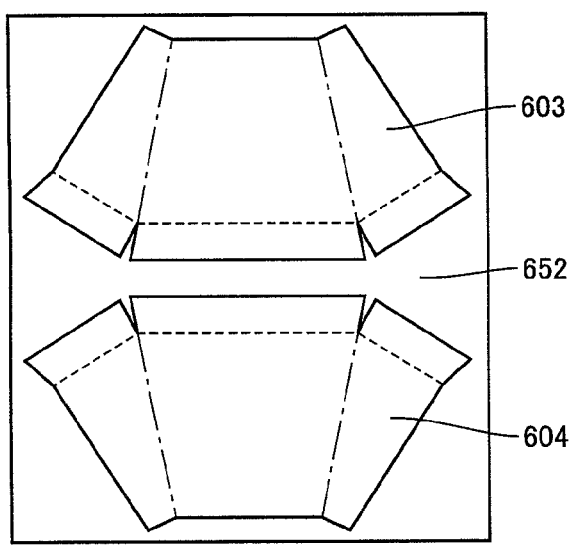
FIG. 9 illustrates the method of manufacturing interphase insulating member 60, 64 shown in FIG. 3.
Figure 10:
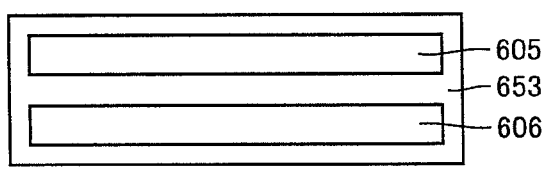
FIG. 10 illustrates the method of manufacturing interphase insulating member 60, 64 shown in FIG. 3.
Figure 11:
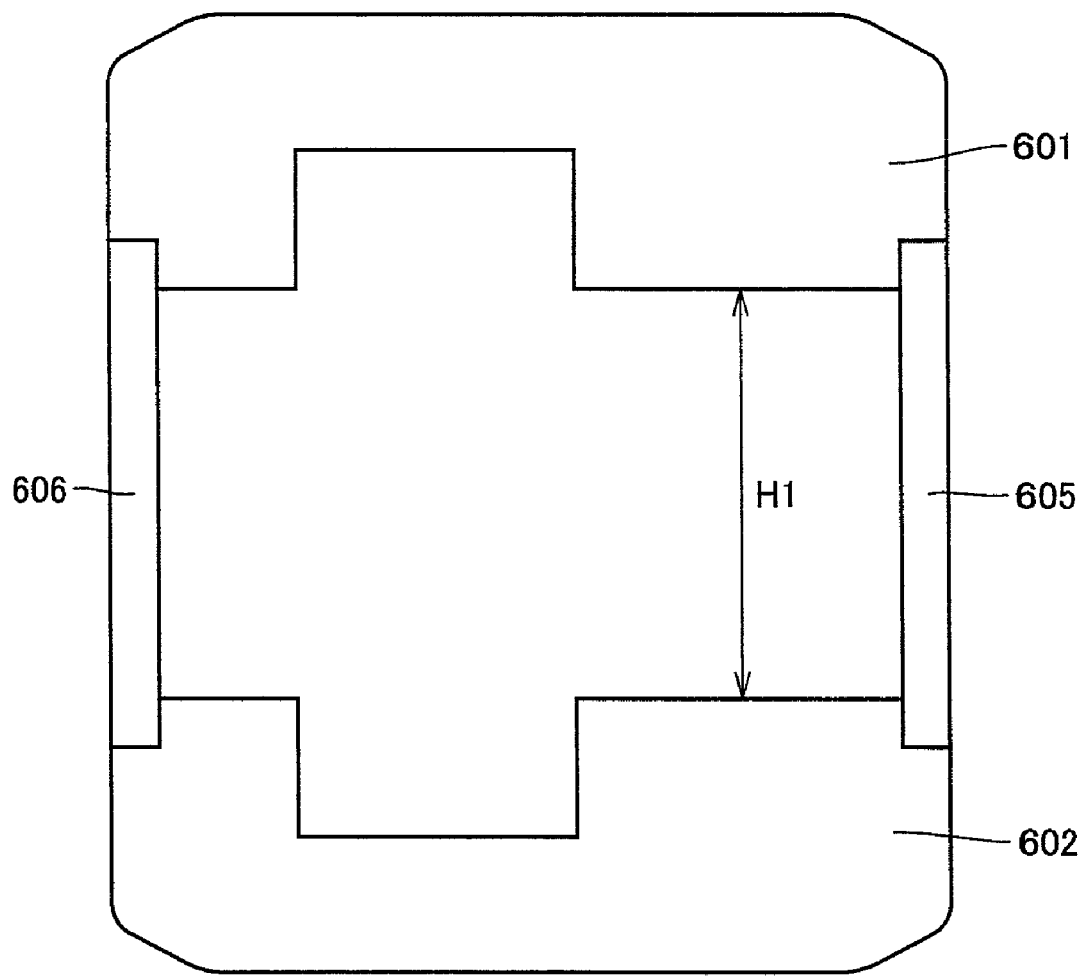
FIG. 11 illustrates the method of manufacturing interphase insulating member 60, 64 shown in FIG. 3.
Figure 12:
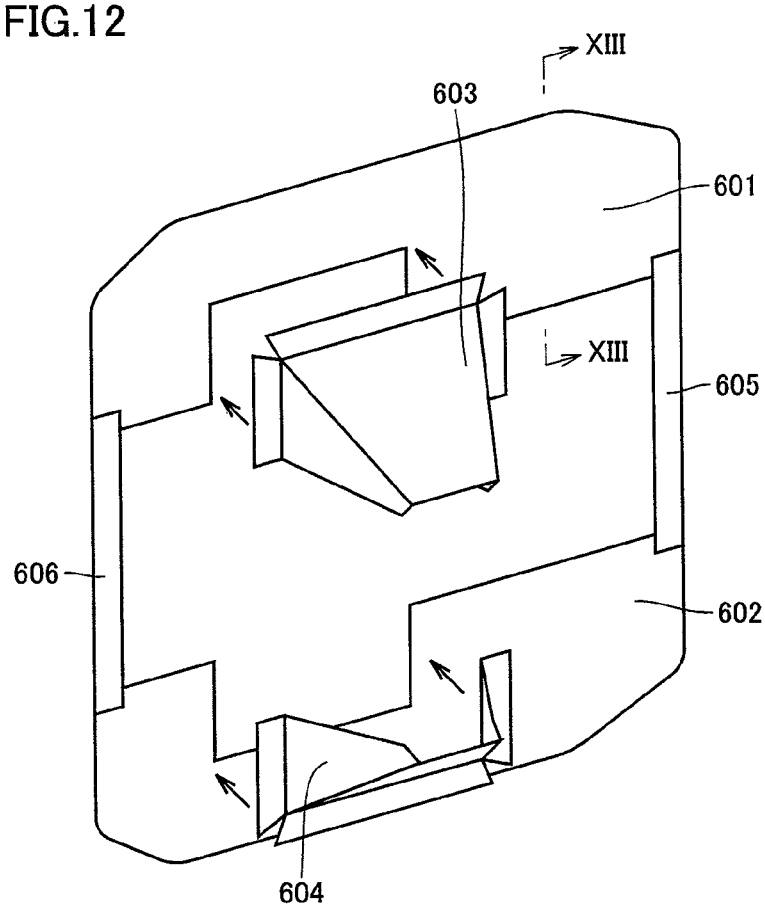
FIG. 12 illustrates the method of manufacturing interphase insulating member 60, 64 shown in FIG. 3.

FIGS. 8 to 12 illustrate the method of manufacturing interphase insulating member 60, 64 shown in FIG. 3. FIG. 8 is a plan view of flat portions 601 and 602 of FIG. 3 during manufacturing. FIG. 9 is a plan view of nose portions 603 and 604 of FIG. 3 during manufacturing, and FIG. 10 is a plan view of leg portions 605 and 606 during manufacturing. FIGS. 11 and 12 are first and second illustrations showing steps of manufacturing interphase insulating member 60 formed by flat portions 601 and 602, nose portions 603 and 604 and leg portions 605 and 606 shown in FIGS. 8 to 10, respectively.

Referring to FIGS. 8 to 10, flat portions 601 and 602 are formed by punching out a sheet material 651. Each of flat portions 601 and 602 has a partially cut-out rectangular portion. Flat portions 601 and 602 and nose portions 603 and 604 may be formed by punching out one resin film.

Referring to FIG. 11, after flat portions 601 and 602 and leg portions 605 and 606 are formed from sheet materials 651 and 653, respectively, opposite ends of leg portions 605 and 606 are adhered to flat portions 601 and 602, at opposite ends of flat portions 601 and 602. Here, flat portions 601 and 602 are arranged such that respective cut-out portions oppose to each other at a distance H1 therebetween, which distance corresponds to the length of stator core 40 in the direction of rotation shaft. For adhesion, thermal compression bonding sheet or an adhesive tape of sufficient adhesive power is used.

Referring to FIG. 12, after leg portions 605 and 606 are adhered to flat portions 601 and 602, nose portions 603 and 604 are adhered to respective cut-out portions of flat portions 601 and 602. Similar to adhesion of leg portions 605 and 606 to portions 601 and 602, for adhesion, thermal compression bonding sheet or an adhesive tape of sufficient adhesive power is used.

Here, if the thickness of leg portions 605 and 606 does not much decrease the coil occupation ratio in the slot, flat portions 601 and 602 and leg portions 605 and 606 may be formed integrally. In that case, there remains a non-used region surrounded by flat portions 601 and 602 and leg portions 605 and 606 and, if nose portions 603 and 604 are formed from this region, production yield could be improved.

In the foregoing description, leg portions 605 and 606 are adhered to flat portions 601 and 602 and thereafter nose portions 603 and 604 are adhered to flat portions 601 and 602. The order of adhesion of leg portions 605 and 606 and nose portions 603 and 604 to flat portions 601 and 602 may be reversed. Specifically, nose portions 603 and 604 may be adhered first to flat portions 601 and 602 and then, leg portions 605 and 606 may be adhered to flat portions 601 and 602.

Though not specifically shown, the method of manufacturing interphase insulating members 62 and 66 shown in FIG. 4 is the same as the method of manufacturing interphase insulating members 60 and 64 described above.

Figure 13:
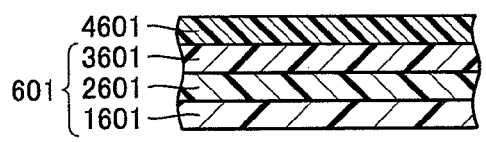
FIG. 13 is a cross-sectional view taken along the line XIII-XIII of FIG. 12.

FIG. 13 is a cross-sectional view taken along the line XIII-XIII of FIG. 12. Referring to FIG. 13, flat portion 601 is formed of an unwoven fabric layer 1601, a polyethylene naphthalate (PEN) layer 2601, and an unwoven fabric layer 3601, and on unwoven fabric layer 3601, an epoxy resin layer 4601 is provided. Thickness of epoxy resin layer 4601 is thinner than flat portion 601. Further, epoxy resin layer 4601 has higher toughness than flat portion 601, and has sufficient plasticity to resist fracturing even when pulled. Preferably, epoxy resin layer 4601 is thinner than unwoven fabric layer 3601. Unwoven fabric layers 1601 and 3601 are implemented, for example, by NOMEX (registered trademark). As for the method of adhering epoxy resin layer 4601 to unwoven fabric layer 3601, pre-formed epoxy resin layer 4601 may be brought into contact with unwoven fabric layer 3601 and then epoxy resin layer 4601 may be heated. Alternatively, epoxy resin may be heated to have fluidity, and semi-liquid epoxy resin may be applied to the surface of unwoven fabric layer 3601 and cooled, to form epoxy resin layer 4601.

Epoxy resin layer 4601 having high toughness serves to prevent fracture at the time of folding and bending. Further, as epoxy resin 4601 prevents fracture, inner PEN layer 2601 is protected.

Figure 14:
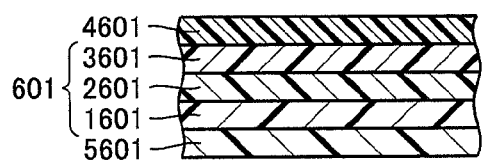
FIG. 14 is a cross-section of a flat portion in accordance with another aspect.

FIG. 14 is a cross section of the flat portion in accordance with another aspect. Referring to FIG. 14, epoxy resin layers 4601 and 5601 may be provided both on the front and rear surfaces of flat portion 601. Epoxy resin layers 4601 and 5601 are both made thinner than flat portion 601. When epoxy resin layers 4601 and 5601 are formed on both surfaces, the same method of forming as that of forming epoxy resin layer only on one surface as shown in FIG. 13 may be adopted.

Figure 15:
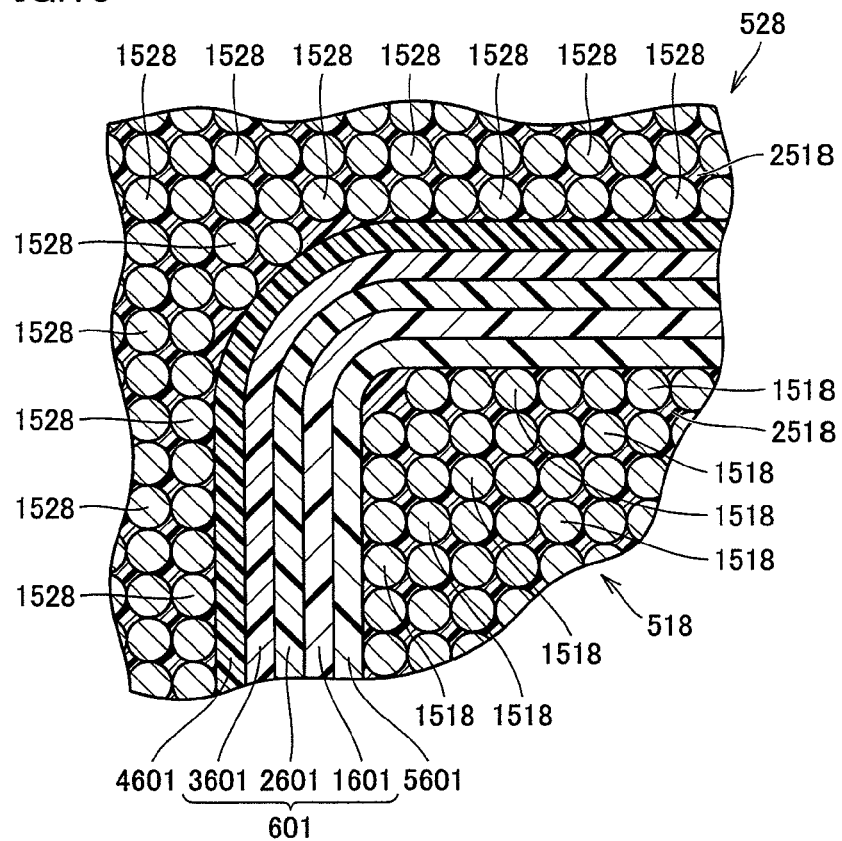
FIG. 15 is a cross-section of a coil in contact with the flat portion.

FIG. 15 is a cross-sectional view of coils in contact with the flat portion. Referring to FIG. 15, coils 518 and 528 are formed of conductors 1518 and 1528, respectively. In order to secure coils 518 and 528, conductors 1518 and 1528 are fixed by resin material (varnish) 2518 containing epoxy resin. Conductor 1518 as the conducting member is fixed by varnish 2518, and varnish 2518 has, as the main component, the same component as the epoxy resin forming epoxy resin layers 4601 and 5601. Therefore, varnish 2518 is tightly adhered to epoxy resin layers 4601 and 5601, and conductor 1518 and 1528 forming coils 518 and 528 can surely be fixed by varnish 2518.

Figure 16:
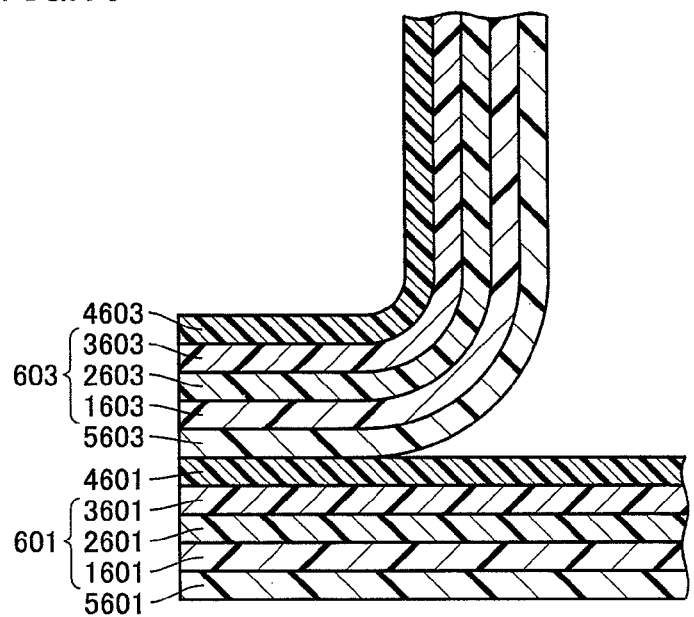
FIG. 16 is a cross-section of a joint portion between the flat portion and the nose portion.

FIG. 16 is a cross section of a joint portion between the flat portion and the nose portion. Referring to FIG. 16, both flat portion 601 and nose portion 603 have the stacked structure of epoxy resin layer 5601, unwoven fabric layer 1601, PEN layer 2601, unwoven fabric layer 3601 and epoxy resin layer 4601. At the joint interface between flat portion 601 and nose portion 603, epoxy resin layers 4601 and 5601 are in contact with each other. Thus, firm adhesion of epoxy resin layers to each other is realized.

Figure 17:
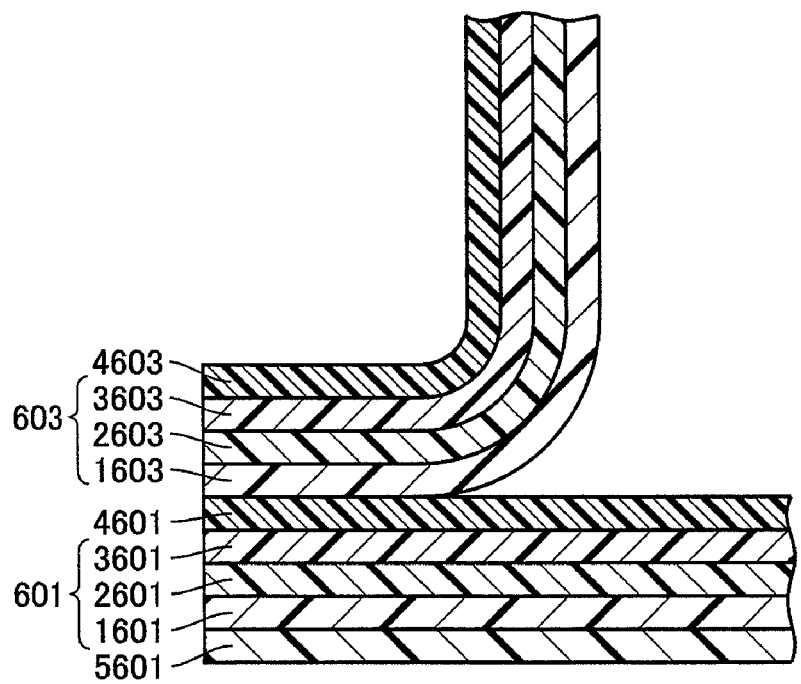
FIG. 17 is a cross-section of a joint portion between the flat portion and the nose portion in accordance with another aspect.

FIG. 17 is a cross section of a joint portion between the flat portion and the nose portion in accordance with another aspect. Referring to FIG. 17, this example differs from FIG. 16 in that epoxy resin layer 5601 is not provided on the side of nose portion 603. As shown, the epoxy resin layer may not be formed on one or both surfaces of joint interface. A structure is preferred in which epoxy resin layers are provided both on nose portion 603 and flat portion 601 and the epoxy resin layers are in contact with each other, as tighter contact can be attained therebetween.

Figure 18:
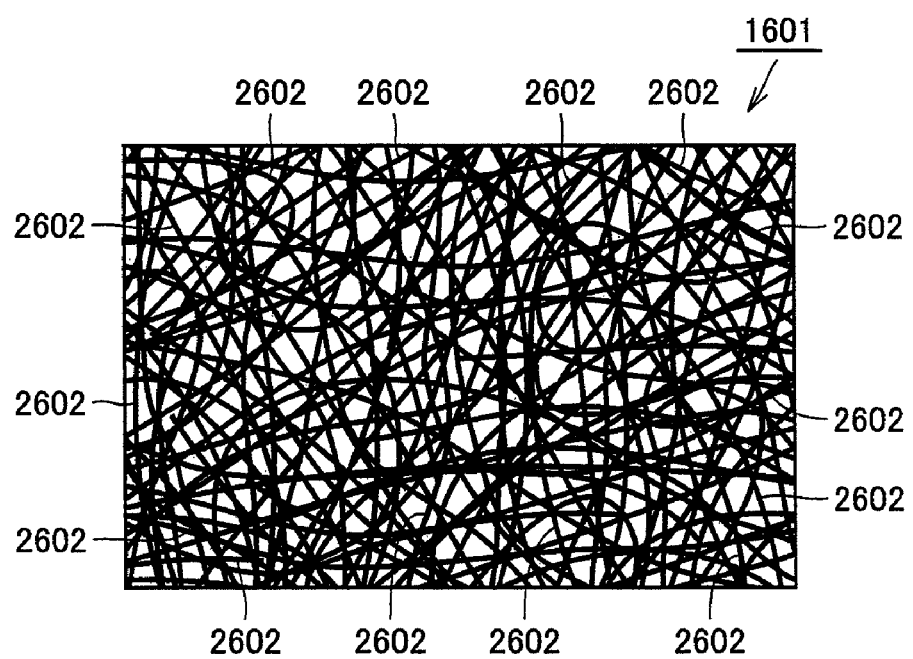
FIG. 18 is a plan view of a non-woven fabric layer.

FIG. 18 is a plan view of the unwoven fabric layer. Referring to FIG. 18, unwoven fabric layer 1601 is an aggregation of fibers 2602, and the plurality of fibers 2602 are not woven. Fiber 2602 may be organic or inorganic, and need to have sufficient strength as required of flat portion 601 and nose portion 603.

Specifically, the interphase insulating member in accordance with the present invention is a flexible interphase insulating member 60, 62, 64, 64, 66 insulating neighboring two phases of coil ends 50E and 52E formed by U-phase coils 51A and 53A, V-phase coils 51B and 53B and W-phase coils 51C and 53C as a plurality of stator coils on end surfaces 42a, 42b of stator core 40 in the direction of rotor shaft 10 as the rotation shaft, including a flat portion 601 interposed between and insulating neighboring coil ends of two phases, and a nose portion 603 as a three-dimensional portion protruding from flat portion 601 and guiding the coil, and having epoxy resin layers 4601 and 5601, as reinforcing members formed on a surface of flat portion 601. The insulating member further includes leg portions 605, 606 connecting a plurality of flat portions 601 and 602, and flat portions 601 and 602 and leg portions 605 and 606 are formed of the same material. Epoxy resin layers 4601 and 5601 as reinforcing members have higher toughness than flat portions 601 and 602. Interphase insulating member 60 includes a nonwoven fabric layer 3601 and epoxy resin layers 4601 and 5601.

Interphase insulating members 60, 62, 64 and 66 in accordance with the present invention are flexible interphase insulating members, interposed between U-phase coils 51A and 53A, V-phase coils 51B and 53B and W-phase coils 51C and 53C as multiphase coil windings wound around the stator core, and insulate these from each other, and the insulating member includes unwoven fabric layers 1603 and 3603, and epoxy resin layers 4603 and 5603 provided to be in contact with unwoven fabric layers 1603 and 3603.

The rotating electric machine in accordance with the present invention includes interphase insulating members 60, 62, 64 and 66, and varnish 2518 as binding member, containing epoxy resin, for securing the coil windings.

Interphase insulating members 60, 62, 64 and 66 structured as described above are provided with epoxy resin layers 4601 and 5601 and, therefore, fracture can be prevented even when interphase insulating members 60, 62, 64 and 66 are pulled. Further, even when each coil is pressed against interphase insulating member 60, fracture of interphase insulating member 60, 62, 64 and 66 can be prevented, as interphase insulating member 60, 62, 64 and 66 have high toughness. Further, epoxy resin layers 4601 and 5601 are flexible and, therefore, they do not hinder deformation of interphase insulating member 60, 62, 64 and 66. As a result, the size of rotating electric machine is not increased.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A flexible interphase insulating member for insulating neighboring two phases of coil ends formed by a plurality of stator coils at an end surface of a stator core in a direction of a rotation shaft, the flexible interphase insulating member comprising:
   a flat portion interposed between said coil ends of neighboring two phases and insulating these from each other;
   a three-dimensional portion having a three-dimensional shape protruded from said flat portion and guiding a coil; and
   a reinforcing member provided on a surface of said flat portion,
   wherein said reinforcing member is a film configured to contain an epoxy material in contact with a conductor forming the coil, and
   wherein said reinforcing member is provided on both opposing surfaces of said flat portion.

2. The interphase insulating member according to claim 1, further comprising
   a leg portion connecting a plurality of said flat portions, said flat portion and said leg portion being formed of the same material.

3. The interphase insulating member according to claim 1, wherein said reinforcing member has higher toughness than said flat portion.

4. The interphase insulating member according to claim 1, wherein said flat portion includes a nonwoven fabric layer.

5. A rotating electric machine, comprising:
   the interphase insulating member according to claim 4, and
   a binding member in contact with said reinforcing member and containing epoxy resin for securing said coil windings.

* * * * *